US008786232B2

(12) United States Patent  (10) Patent No.: US 8,786,232 B2
Chai et al.  (45) Date of Patent: Jul. 22, 2014

(54) THERMAL STRESS REDUCTION IN AIRCRAFT MOTOR CONTROLLERS

(75) Inventors: Huazhen Chai, Caledonia, IL (US); Adam M. White, Belvidere, IL (US); Mustansir Kheraluwala, Lake Zurich, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 18 days.

(21) Appl. No.: 13/451,644

(22) Filed: Apr. 20, 2012

(65) Prior Publication Data

US 2013/0278229 A1    Oct. 24, 2013

(51) Int. Cl.
*H02P 1/04*    (2006.01)

(52) U.S. Cl.
USPC ........................................................ 318/430

(58) Field of Classification Search
CPC ........... H02P 1/42; H02P 7/29; B62D 5/0487; F04D 27/004; G01R 31/343; A63H 19/14; A63H 19/24; A63H 2019/246; B21B 37/52; B21B 37/54
See application file for complete search history.

(56) References Cited

U.S. PATENT DOCUMENTS

| | | | | |
|---|---|---|---|---|
| 6,751,105 | B2 * | 6/2004 | Yamanaka et al. | 363/41 |
| 2003/0107342 | A1 * | 6/2003 | Gallegos-Lopez | 318/701 |
| 2012/0249021 | A1 * | 10/2012 | Hamanaka et al. | 318/139 |
| 2013/0147416 | A1 * | 6/2013 | Khalil et al. | 318/701 |

* cited by examiner

*Primary Examiner* — Shawki S Ismail
*Assistant Examiner* — Zoheb Imtiaz
(74) *Attorney, Agent, or Firm* — Cantor Colburn LLP

(57) ABSTRACT

A thermal stress reduction method includes ramping an electric power generator to start an aircraft engine, for a time period associated with the aircraft engine start sequence toggling a three-level inverter switch array to a three-level pulse width modulation mode, determining if a first time interval in the three-level pulse width modulation mode exceeded a predetermined three-level pulse width modulation mode interval, in response to the first time interval exceeding the three-level pulse width modulation mode interval, toggling the three-level inverter switch array to a two-level pulse width modulation mode, determining if a second time interval in the two-level pulse width modulation mode exceeded a predetermined two-level pulse width modulation mode interval and in response to the second time interval exceeding the two-level pulse width modulation mode interval, toggling the three-level inverter switch array to the three-level pulse width modulation mode.

10 Claims, 11 Drawing Sheets

THERMAL STRESS REDUCTION IN AIRCRAFT MOTOR CONTROLLERS

BACKGROUND OF THE INVENTION

The present invention relates to aircraft electric start motors, and more specifically, to motor controllers for managing thermal stress associated with electrical start of aircraft engines.

The engines in an aircraft are typically started by non-electrical methods, for example, a start turbine driven by compressed air. An increased number of aircrafts in recent years have begun to use electric generators to start the engine by operating the generator in motoring mode, powered by a motor controller. The motor controllers on aircraft are typically designed for other continuous duty applications, such as, cabin air compressor, air recirculation fans, and fuel pumps. When there is a need for an engine start, typically one or two of the available motor controllers are called upon from their normal duty to start the engine, and then returned to their normal duty. Because of the very high thermal stress to the motor controller semiconductor power switches (e.g., an insulated gate bipolar transistor (IGBT) switch) during an engine start, however brief this engine start duty may be, the IGBT switch in conventional motor controllers are sized for this brief engine start duty, or an additional motor controller is used in parallel. As a result, the motor controller becomes heavier, or if parallel motor controllers are used, the system weight increases due to additional power feeders and contactors.

BRIEF DESCRIPTION OF THE INVENTION

Exemplary embodiments include, during an aircraft engine start sequence, a thermal stress reduction method for an aircraft motor controller having a three-level inverter switch array, and configured to control an electric power starter/generator coupled to an aircraft engine. The method includes ramping the electric power starter/generator to start the aircraft engine, for a time period associated with the aircraft engine start sequence toggling the three-level inverter switch array to a three-level pulse width modulation mode, determining if a first time interval in the three-level pulse width modulation mode exceeded a predetermined three-level pulse width modulation mode interval. If the first time interval exceeds the three-level pulse width modulation mode interval, the method further includes toggling the three-level inverter switch array to a two-level pulse width modulation mode, determining if a second time interval in the two-level pulse width modulation mode exceeded a predetermined two-level pulse width modulation mode interval and in response to the second time interval exceeding the two-level pulse width modulation mode interval, toggling the three-level inverter switch array to the three-level pulse width modulation mode.

Additional exemplary embodiments include an engine start system with an electric power starter/generator, an aircraft engine coupled to the electric power starter/generator, an aircraft motor controller coupled to the electric power generator. The system further includes a thermal stress reduction process residing on the motor controller and configured to ramp the electric power starter/generator to start the aircraft engine, for a time period associated with the aircraft engine start sequence toggle the three-level inverter switch array to a three-level pulse width modulation mode, determine if a first time interval in the three-level pulse width modulation mode exceeded a predetermined three-level pulse width modulation mode interval. The process is further configured to, in response to the first time interval exceeding the three-level pulse width modulation mode interval, toggle the three-level inverter switch array to a two-level pulse width modulation mode, determine if a second time interval in the two-level pulse width modulation mode exceeded a predetermined two-level pulse width modulation mode interval, and in response to the second time interval exceeding the two-level pulse width modulation mode interval, toggle the three-level inverter switch array to the three-level pulse width modulation mode.

Additional exemplary embodiments include, during an aircraft engine start sequence, a thermal stress reduction method for an aircraft motor controller having a three-level inverter switch array, and configured to control an electric power starter/generator coupled to an aircraft engine. The method includes ramping the electric power generator to start the aircraft engine, and for a time period associated with the aircraft engine start sequence, applying a current profile to the current from the electric power generator to the aircraft engine. The current profile controls the current to reduce the thermal dissipation in the three-level inverter switch.

Additional exemplary embodiments include an engine start system with an electric power starter/generator having a three-level inverter, an aircraft engine coupled to the electric power generator, an aircraft motor controller coupled to the electric power generator, a thermal stress reduction process residing on the motor controller and configured to ramp the electric power generator to start the aircraft engine and for a time period associated with the aircraft engine start sequence, apply a current profile to the current from the electric power generator to the aircraft engine, the current profile controlling the current to reduce the thermal dissipation in the three-level inverter switch.

Additional exemplary embodiments include, during an aircraft engine start sequence, a thermal stress reduction method for an aircraft motor controller having a three-level inverter switch array, and configured to control an electric power generator coupled to an aircraft engine, the method including ramping the electric power generator to start the aircraft engine and for a time period associated with the aircraft engine start sequence, ramping an output frequency of the motor controller from an initial frequency, and controlling the output frequency to reduce the thermal dissipation in the three-level inverter switch.

Further exemplary embodiments include an engine start system, including an electric power starter/generator having a three-level inverter, an aircraft engine coupled to the electric power generator, an aircraft motor controller coupled to the electric power generator, a thermal stress reduction process residing on the motor controller and configured to ramp the electric power generator to start the aircraft engine and for a time period associated with the aircraft engine start sequence, ramping an output frequency of the motor controller from an initial frequency, controlling the output frequency to reduce the thermal dissipation in the three-level inverter switch.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
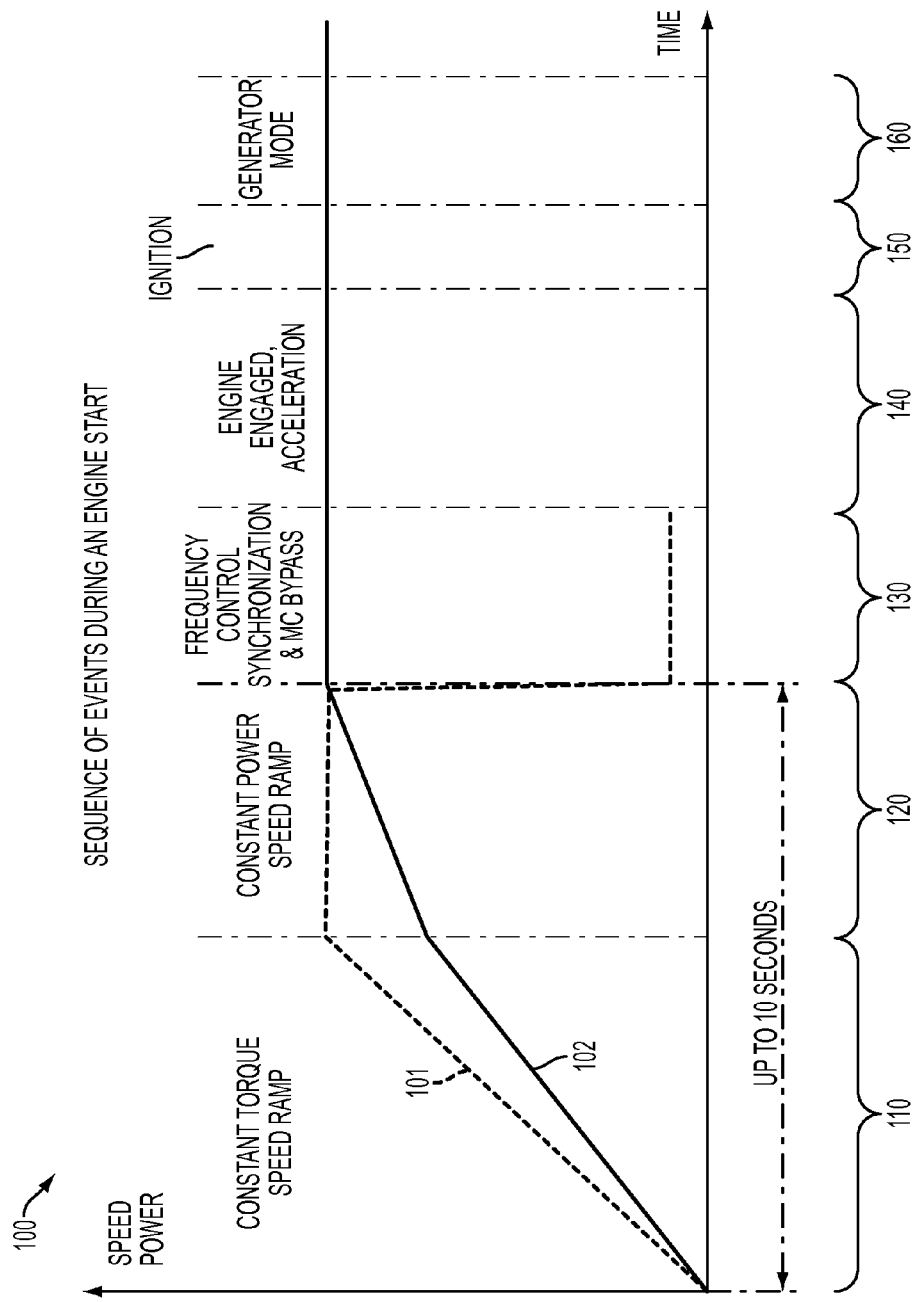
FIG. 1 illustrates a schematic diagram of an engine start circuit in which the exemplary methods and systems described herein are implemented.

FIG. 1 illustrates a schematic diagram of an engine start circuit 100 in which the exemplary methods and systems described herein are implemented. Driven by the motor controller, the starter/generator spins up with or without the engine engaged. As described herein, the generators are implemented for various tasks on the aircraft, and can also be implemented to start the engines. The curve 101 represents the applied power and the curve 102 represents the resultant speed. During a first period 110, the generator applies a constant torque for a speed ramp. During a second time period 120, the generator provides constant power with a constant speed. During a third time period 130, the generator ramps down the applied power and the speed remains constant. During the third time period, frequency control is typically implemented, synchronizing the starter/generator frequency to bus frequency and bypassing control from the motor controller. During a fourth time period, 140, the speed stays constant and the engines are engaged and begin acceleration. During a fifth and sixth time periods the engines ignite and become fully functional.

Figure 2:
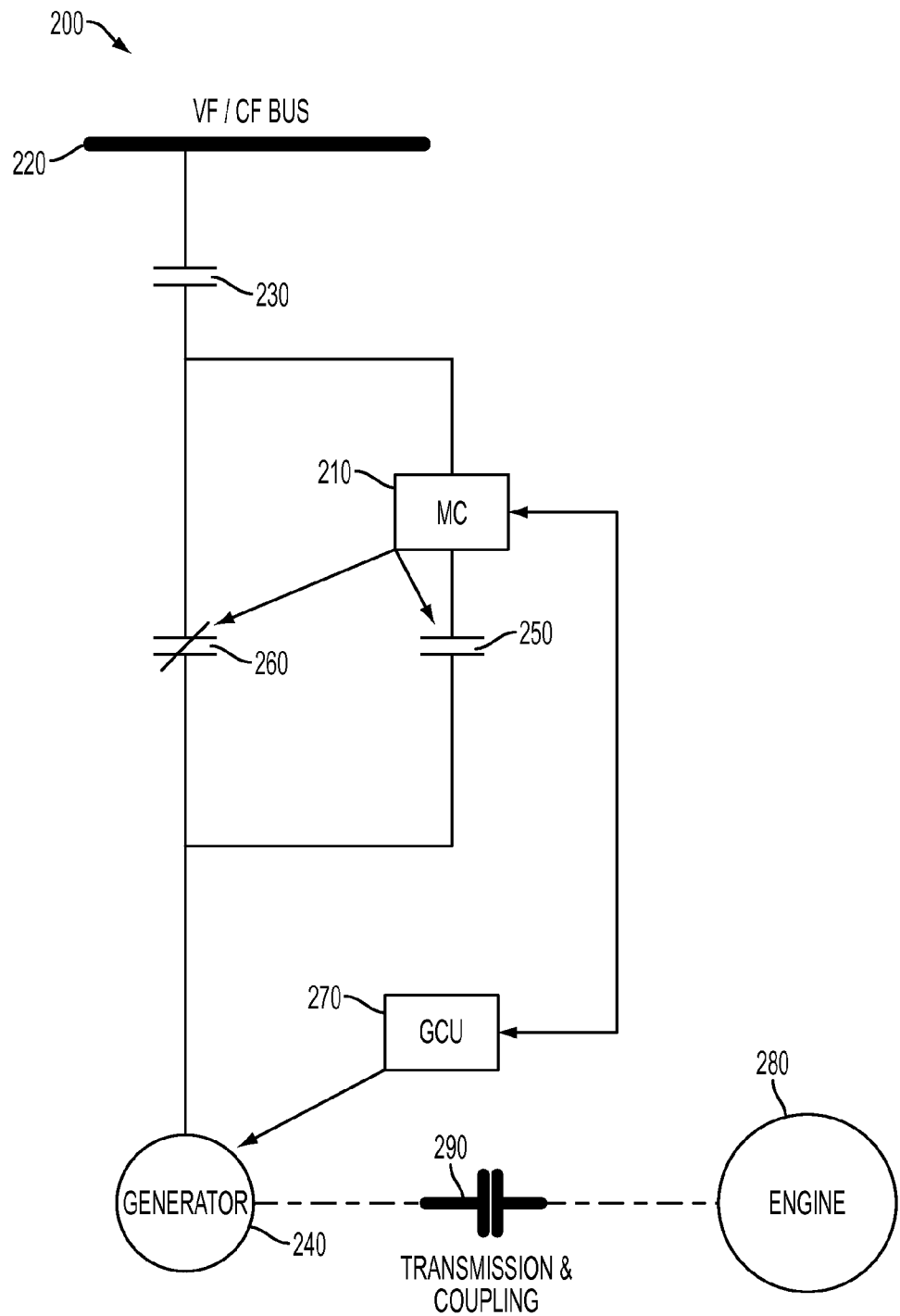
FIG. 2 schematically illustrates an engine start circuit in which exemplary embodiments may be implemented.

FIG. 2 schematically illustrates an engine start circuit 200 in which exemplary embodiments may be implemented. A motor controller 210 is fed from a variable frequency/constant frequency (VF/CF) bus 220 through a contactor/breaker 230. The output of motor controller 210 is connected to starter/generator 240 through a contactor/breaker 250, which is in parallel with a contactor/breaker 260. The motor controller 210 is coupled to the generator 240 via a generator control unit (GCU) 270. The starter/generator 240 is coupled to the aircraft engine 280 via suitable transmission and coupling 290. After the generator 240 spins up to near synchronous speed and is synchronized with the bus, the contactor/breaker 250 opens and contactor/breaker 260 closes.

As described herein, the electric power generators are also driven by the aircraft engines to generate electricity for power distribution within the aircraft. In a more electric aircraft, the engines are often started by using these generators in motoring mode, thus eliminating need for air-driven turbine starters. The spin up of the generator lasts typically from a few seconds to tens of seconds, depending on the engine size and if the engine is engaged when spinning the generator. Consequently there is no dedicated engine start motor controller. Instead, a motor controller installed for driving other normal duty aircraft loads may be called upon to perform this short engine start duty.

Figure 3:
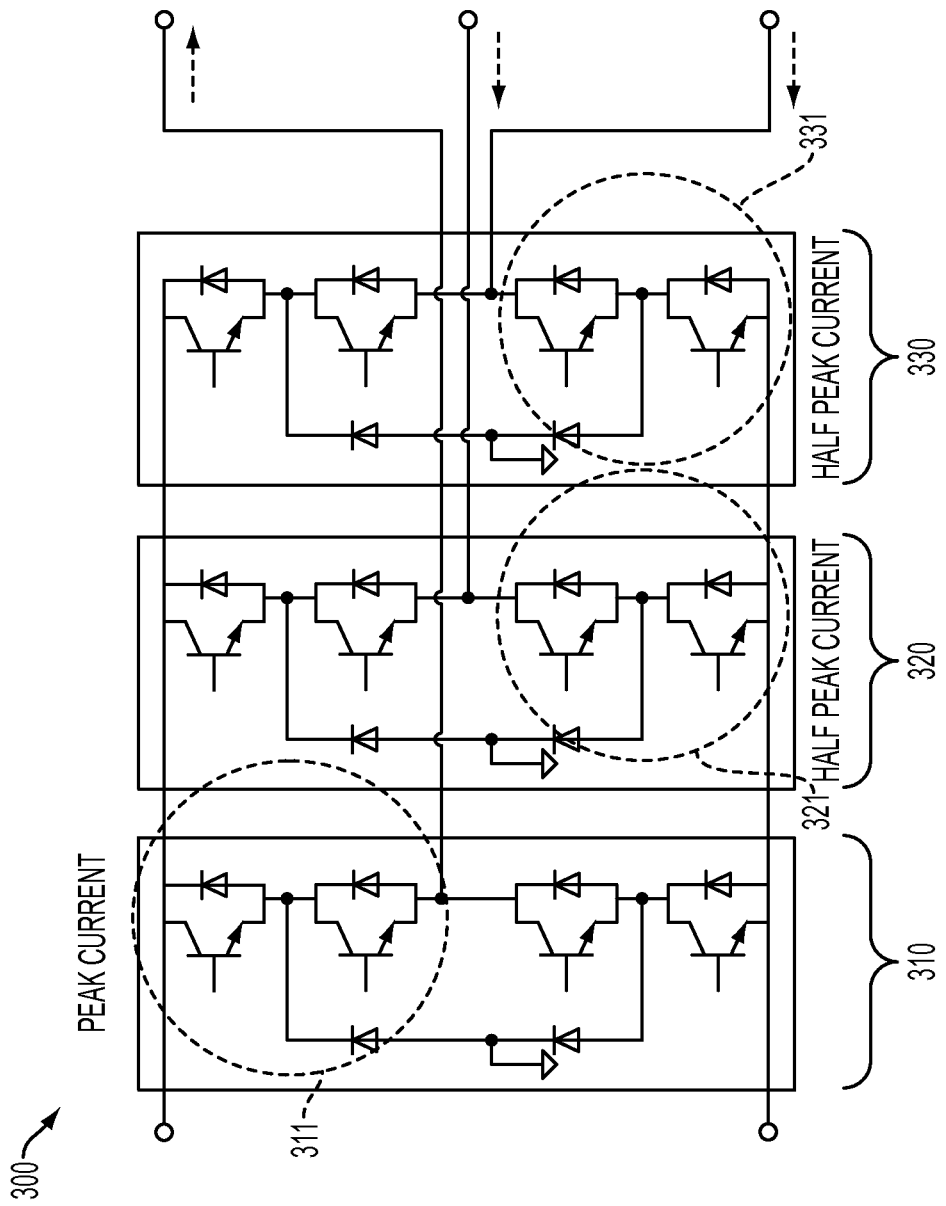
FIG. 3 illustrates a three-level inverter IGBT switch array.

FIG. 3 illustrates a three-level inverter IGBT switch array 300 in which exemplary embodiments for toggling between a two-level pulse width modulation (PWM mode and a three-level PWM mode may be implemented. It can be appreciated that other power switches can be implemented in other exemplary embodiments. The array 300 includes three legs 310, 320, 330, each leg 310, 320, 330 including one or more IGBT switches. As described herein, the IGBT switch is implemented with the motor controllers (e.g., the motor controller 210 in FIG. 2) of aircraft. In one embodiment, a three-level inverter motor drive PWM control method is implemented to spread the power semiconductor (e.g. IGBT) thermal stress more evenly during an electrical start of the aircraft engines. When a motor controller is used to ramp up the electric starter/generator machine for the purpose of engine start in a more electric aircraft, one of the motor controller power semiconductor switch (e.g., IGBT) junction could be subject to a very high thermal stress for a short duration, typically under a second), while the other semiconductor switches are less stressed or even not stressed at all during this same period. The motor controller IGBT switches would have to be sized based on this brief undistributed thermal stress resulting in undesirable weight increase. The engine start duty stresses the motor controller differently as compared to a continuous motoring load. Significant among the differences is the very high thermal and power stresses to the IGBT switch within the first quarter electrical cycle (i.e., the first time period 110 of FIG. 1). The duration of this peak stress is typically shorter than one second. FIG. 3 illustrates, for example, that during peak current conditions in the motor controller, two switches 311 in the first leg 310 experience the highest thermal stress. During half peak current conditions, two of the switches 321, 331 in the second and third legs 320, 330, respectively, experience the highest thermal stress. The exemplary methods described herein spread the thermal stresses more evenly during engine start-up. Within the first quarter (e.g., the first time period 110 of FIG. 1) of this very low frequency electrical cycle (starter/generator being spun up from zero speed), the IGBT switch junction temperature rise can double or even triple in comparison to normal steady state (higher frequency) operation. Increasing the IGBT switch size and weight, and hence the overall motor controller package size and weight, for the sake of this short duty-cycle (one minute) engine start can be addressed with the methods described herein without changing the motor controller package size and weight.

Figure 4:
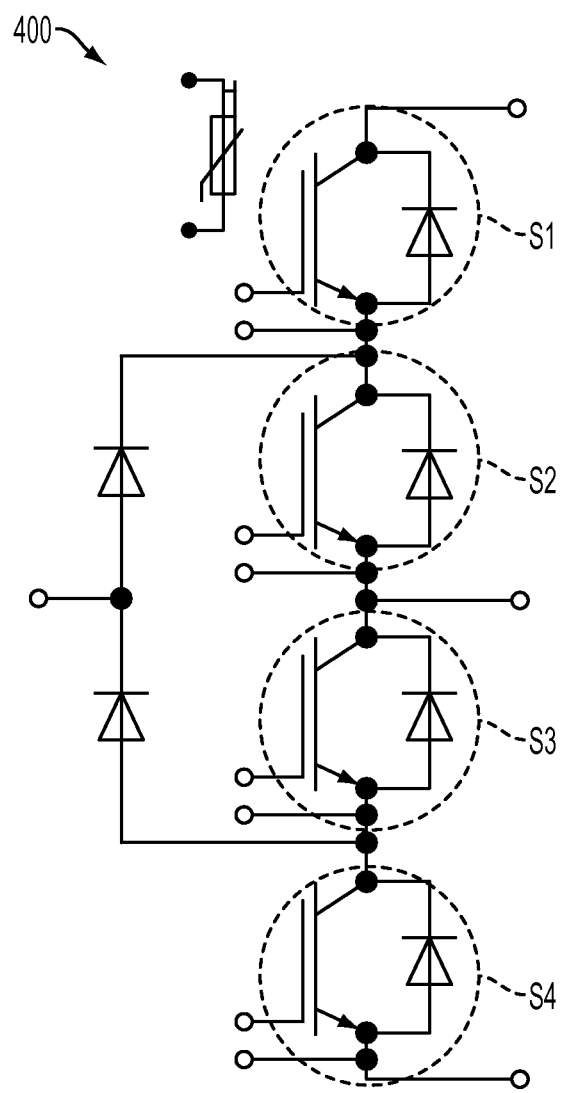
FIG. 4 illustrates an interconnection of four semiconductor switches of one leg in a three-level phase motor controller.
Figure 5:
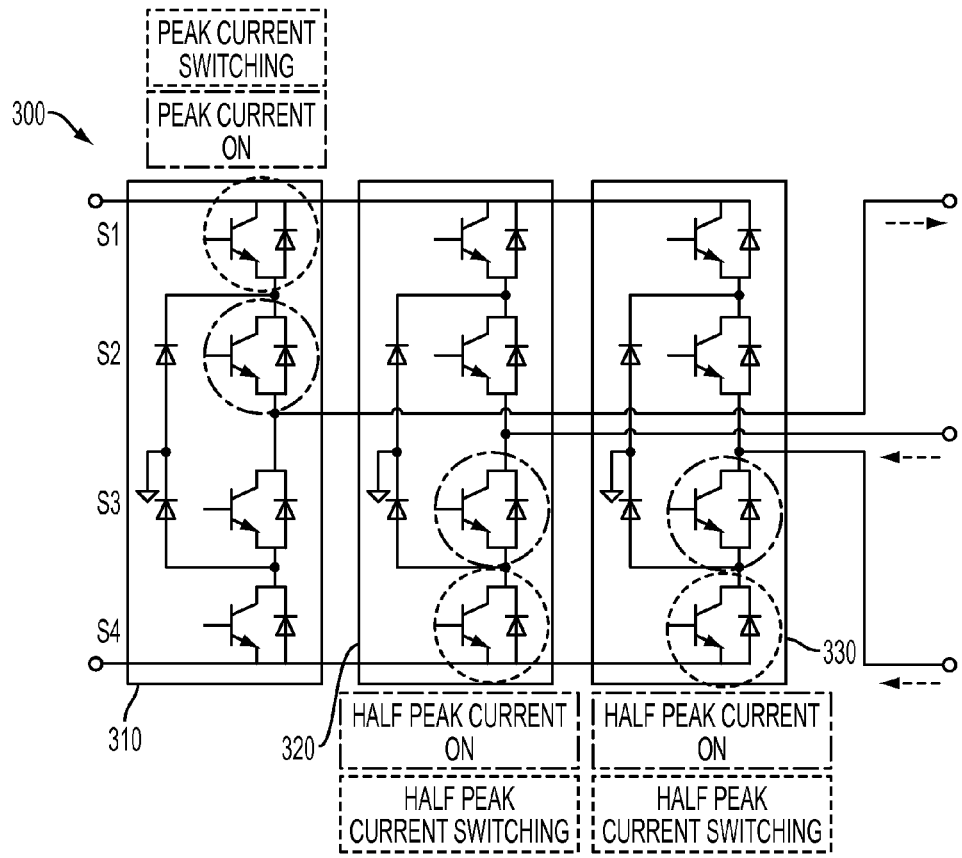
FIG. 5 illustrates the switch array of FIG. 3 in a three-level pulse width modulation mode.
Figure 5:
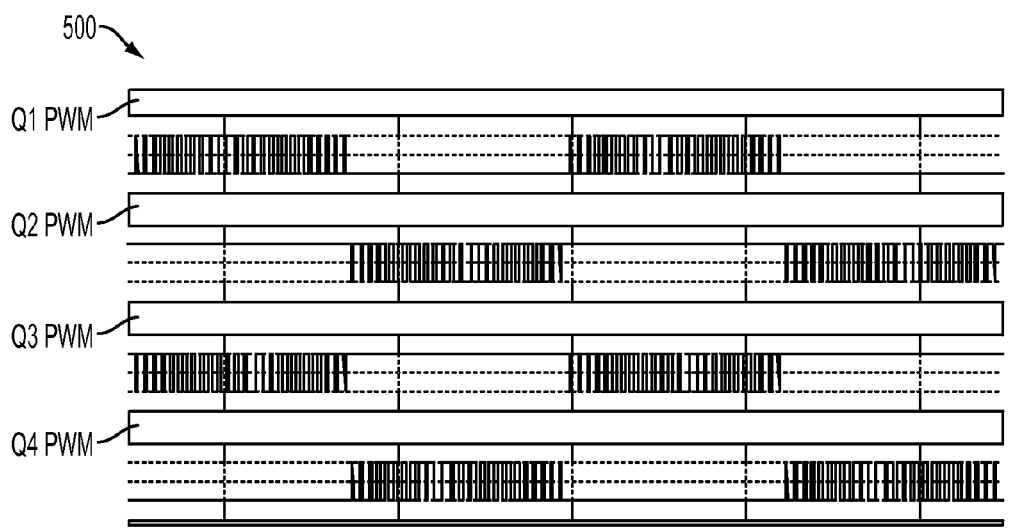

FIG. 4 illustrates an interconnection of four semiconductor switches S1, S2, S3, S4 of one leg 400 in a three-level phase motor controller. For example, the leg 400 can be any of the legs 310, 320, 330 of FIG. 3. For illustrative purposes switches S1, S4 are referred to as "outer" switches, and switches S2, S3 are referred to as "inner" switches. Typically, the starter/generator (e.g., the generator 240 in FIG. 2) is of the wound-field synchronous type. The engine (e.g., the engine 280 in FIG. 2) may or may not be connected to the generator when spinning up the generator. The motor controller output is a three phase ac voltage with a frequency ramp up from 0 Hz (or near 0 Hz) to 400 Hz. Because of the slow frequency ramp, one of the inverter switches could experience a switching loss of nearly 3.14 times of that during normal high frequency steady-state operation, in a two-level inverter or three-level inverter. The IGBT switch thermal time constant is typically less than 100 ms. It is normally the first output cycle sinusoidal peak that thermally stresses the IGBT switch the most during this engine start-up. During this first half of the output frequency cycle, one of the outer switches is continually switching and the adjacent inner switch is in a steady ON state. This results in the outer switch being highly stressed thermally, due to the high incurred switching losses, while the inner switch is lightly thermally stressed, since the inner switch incurs no switching loss. By implementing the PWM methods described herein, the outer and inner IGBT switches in a three-level inverter are switched alternately so the thermal stress to a particular IGBT is reduced significantly resulting in a reasonable rating for the switches during electrical engine start. As described herein, the PWM method toggles between a three-level PWM (when the outer switches perform the PWM switching) mode and a two-level PWM (when the inner switches perform the PWM switching) mode, thus more evenly spreading the number of switching instants between the outer and inner switches. The method reduces the outer switches thermal stress by shifting part of the thermal loss to the inner switches As an example, a period near when the output current from a phase A is at its positive peaks, the highest current passes through switches S1, S2. In a convention three-level PWM mode, the outer switches would be gated for high frequency switching, and the inner switches would be operated as continually on or off. Consequently, the outer switches would produce considerably higher losses than the inner switches. FIG. 5 illustrates the switch array 300 of FIG. 3 in a three-level PWM mode. A pulsing scheme chart 500 for a three-level PWM mode is also illustrated. FIG. 5 illustrates peak current switching ON in switch S1, peak current ON in switch S2, in leg 310, and half peak current ON in switch S3 and half peak current switching ON in switch S4 in the legs 320, 330. In the example shown in FIG. 5, S1 in Phase A would be stressed the most. In one case, the outer switch S1 junction temperature could reach 168 C during the first cycle of engine start and the inner switch junction temperature would only reach 98 C, a difference of 70 C.

Figure 6:
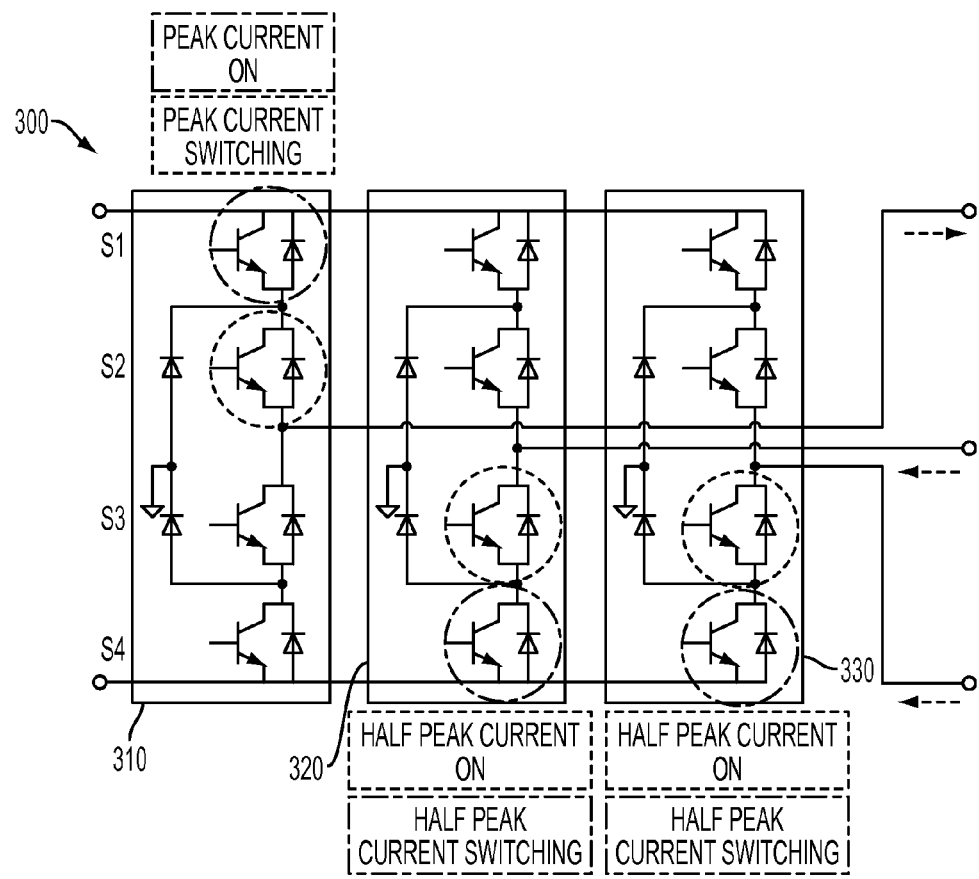
FIG. 6 illustrates the switch array of FIG. 3 in a two-level pulse width modulation mode.
Figure 6:
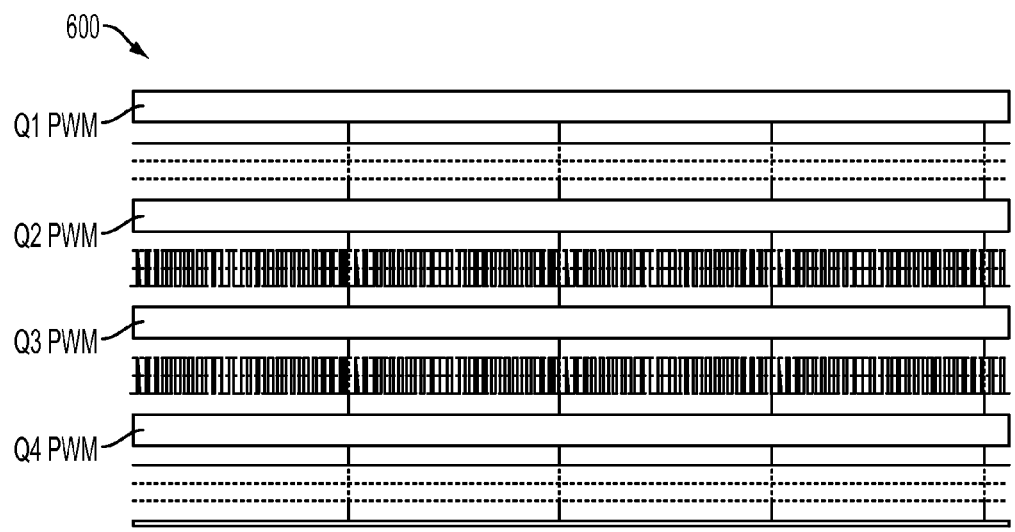

FIG. 6 illustrates the switch array 300 of FIG. 3 in a two-level PWM mode. A pulsing scheme chart 600 for a two-level PWM mode is also illustrated. FIG. 6 illustrates peak current ON in switch S1, peak current switching ON in switch S2, in leg 310, and half peak current switching ON in switch S3 and half peak current ON in switch S4 in the legs 320, 330. If the outer switches are forced to stay in the ON state, and the inner switches are utilized for PWM switching, as illustrated in FIG. 6, the losses on outer switches would be significantly reduced. However, the inner switches are dissipating higher losses in this mode of operation.

Figure 7:
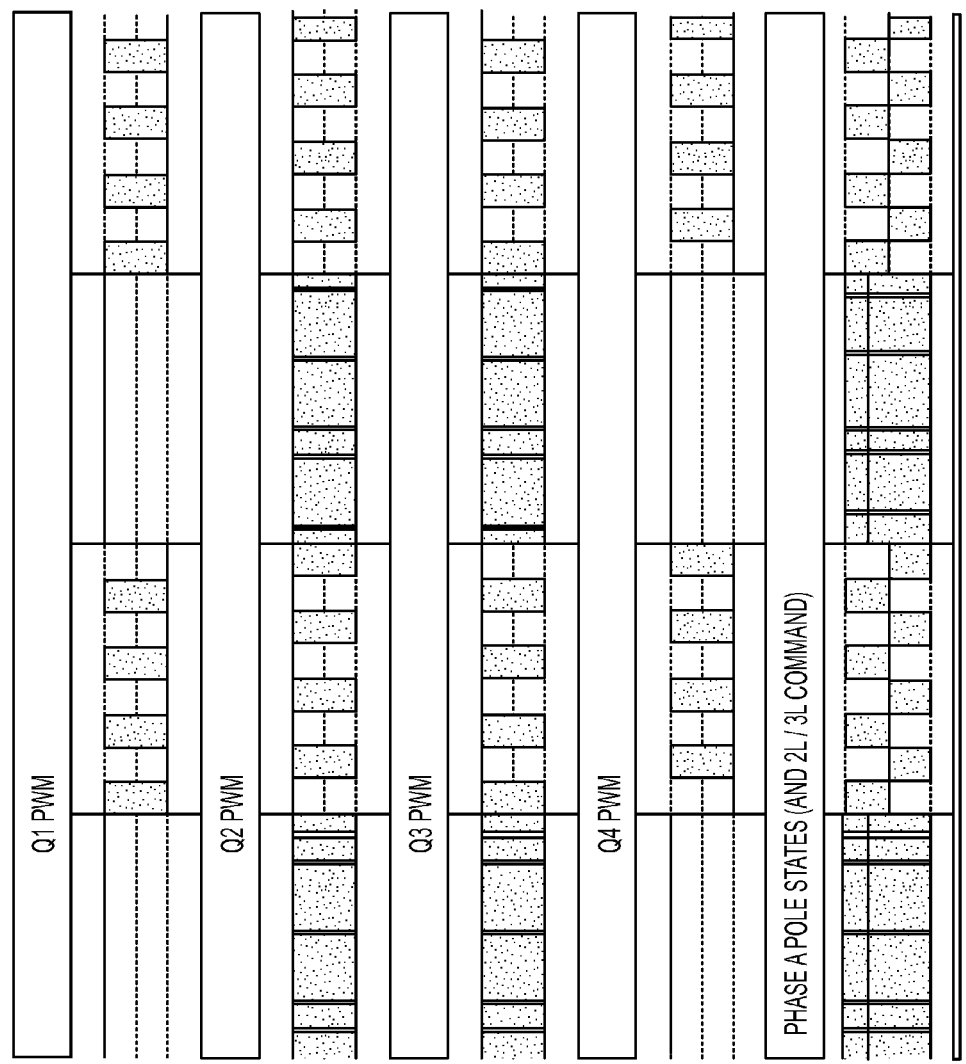
FIG. 7 illustrates an example of a plot of switch gate control signals for one phase that illustrate switching between the two-level pulse width modulation mode and the three-level pulse width modulation mode in accordance with exemplary embodiments.

In one embodiment, by toggling between the two PWM modes illustrated in FIGS. 5 and 6, in a time interval shorter than the semiconductor switch (e.g. IGBT) thermal time constant, the excessive thermal stress normally experienced by only the outer switches during engine starts would now be distributed between the outer and inner switches therefore greatly reducing the thermal stress of individual switches. FIG. 7 illustrates an example of a plot 700 of switch gate control signals for one phase that illustrate switching between the two-level PWM mode and the three-level PWM mode in accordance with exemplary embodiments. The switching losses for the three-level and the two-level PWM modes are different. As such, a ratio is selected for the time intervals for the three-level PWM mode and the two-level PWM mode to be inversely proportional to the ratio of the three-level PWM mode loss in the switch versus the two-level PWM mode loss in the switch. As a result of the toggling between the two-level and three-level PWM modes, a reduction of S1 junction temperature to 145 C as compared to 168 C in conventional PWM modes was achieved. The inner switch S2 junction temperature increases to 150 C, a 5 C difference, therefore a more even thermal distribution.

In one embodiment, higher switching frequencies or carrier frequencies can be used in the two-level PWM mode to reduce common mode voltage output if a common mode filter is used, thereby decreasing the weight and size of the output common-mode filters. In one embodiment, the two-level PWM mode alternating time period is less than the semiconductor thermal time constant of the switches.

Figure 8:
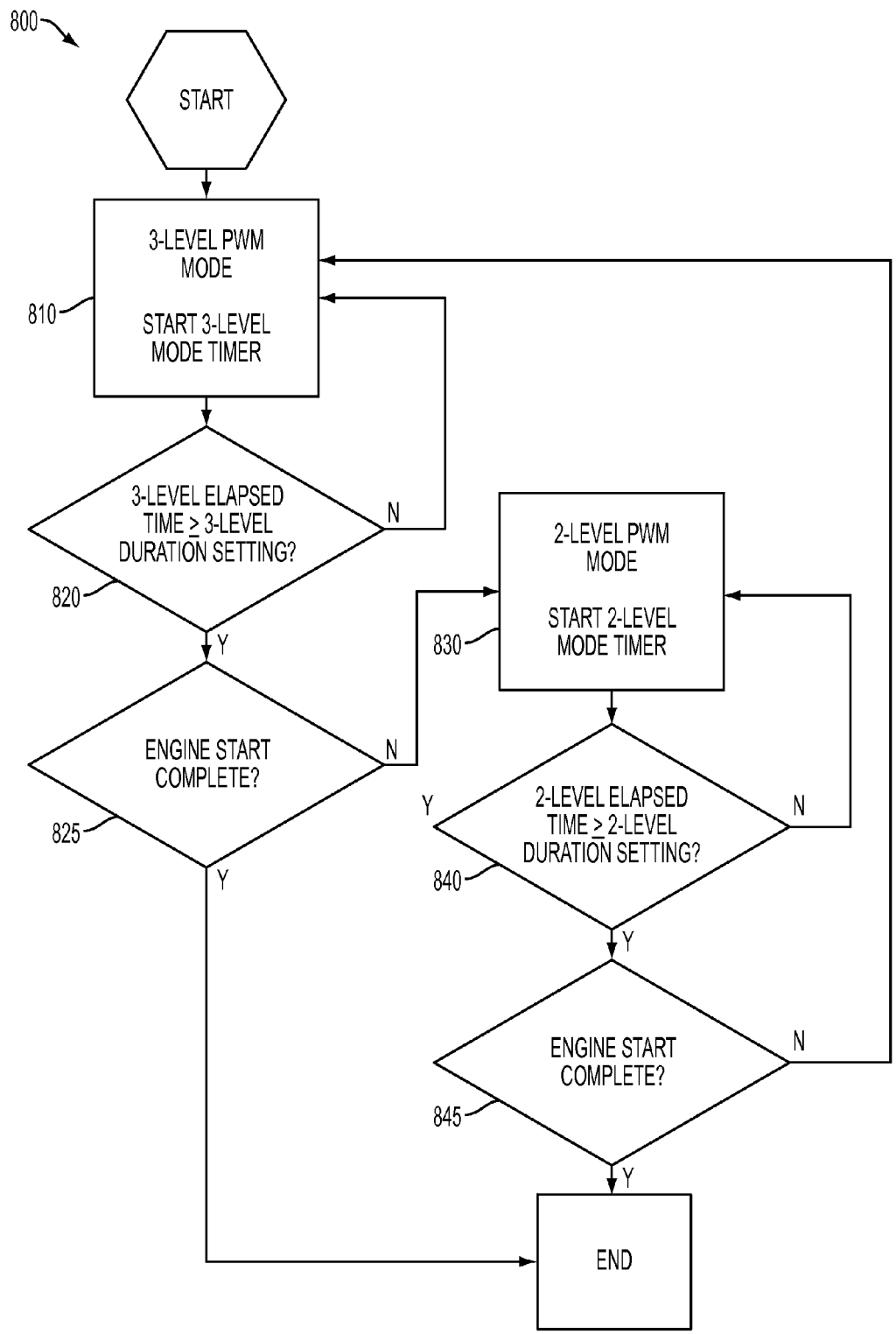
FIG. 8 illustrates a flowchart for a method of toggling between a two-level pulse width modulation mode and a three-level pulse width modulation mode in accordance with exemplary embodiments.

FIG. 8 illustrates a flowchart for a method 800 of toggling between a two-level PWM mode and a three-level PWM mode in accordance with exemplary embodiments. At block 810, the motor controller (e.g., the motor controller 210 of FIG. 2) enters into a three-level PWM mode at which time a timer is set for the three-level PWM mode. At block 820, the motor controller determines whether the elapsed time in the three-level PWM mode has surpassed a pre-determined three-level PWM mode interval. During this time, an increased amount of thermal (power) dissipation occurs on switches S1, S4 as described herein. The predetermined three-level PWM mode interval is selected to switch from the three-level PWM mode before the switches S1, S4 overheat. If the time interval in the three-level PWM mode has not surpassed the pre-determined three-level PWM mode interval at block 820, then the motor controller stays in the three-level PWM mode at block 810. If the time interval in the three-level PWM mode has surpassed the pre-determined three-level PWM mode interval at block 820, then the motor controller enters into a two-level PWM mode at block 830, in which a timer is set for the two-level PWM mode. At block 840, the motor controller determines whether the elapsed time in the two-level PWM mode has surpassed a pre-determined two-level PWM mode interval. During this time, an increased amount of thermal (power) dissipation occurs on switches S2, S3 as described herein. The predetermined two-level PWM mode interval is selected to switch from the three-level PWM mode before the switches S2, S3 overheat. If the time interval in the two-level PWM mode has not surpassed the pre-determined two-level PWM mode interval at block 840, then the motor controller stays in the two-level PWM mode at block 830. If the time interval in the two-level PWM mode has surpassed the pre-determined two-level PWM mode interval at block 840, then the motor controller enters back into a three-level PWM mode at block 830, in which a timer is set for the three-level PWM mode. It can be appreciated that this method 800 repeats thereby toggling between the two-level PWM mode and the three-level PWM mode during the engine start-up as described herein.

In another embodiment, a current profile method that includes a motor controller current profile that reduces IGBT thermal stress during an electrical start of the main engine can be implemented. When the motor controller (e.g., the motor controller 210 of FIG. 2) is used to ramp up the electric generator machine for the purpose of engine start in a more electric aircraft, the power semiconductor switch (e.g., IGBT) junction is subject to a very high thermal stress (for a short durations under a second). The motor controller IGBT switch would have to be sized based on this brief thermal stress resulting in undesirable weight increase. By using the motor controller output current profile described herein, the IGBT switch thermal stress is reduced significantly so that IGBT switch size increase would not be necessary for engine start duty, hence reducing the aircraft weight.

The motor controller designed for a certain continuous motor load can be used to spin the generator machine up to 400 Hz to start the engine. Typically, the generator is of the wound-field synchronous type. The engine may or may not be connected to the generator when spinning the generator. The motor controller output is a three phase AC voltage with a frequency ramp up from zero or close to zero frequency to 400 Hz. Because of the slow frequency ramp, one of the IGBT switch could experience a switching loss of nearly 3.14 times of that during a high frequency steady operation. In addition, the IGBT thermal time constant is less than 100 ms. Typically, the first output cycle sinusoidal peak thermally stresses the IGBT switch the most compared to subsequent peaks. Therefore, if the current is reduced during the first quarter cycle, the IGBT thermal stress would be reduced significantly. Because the current is only reduced for a very short duration the overall generator acceleration time is not noticeably affected.

Figure 9:
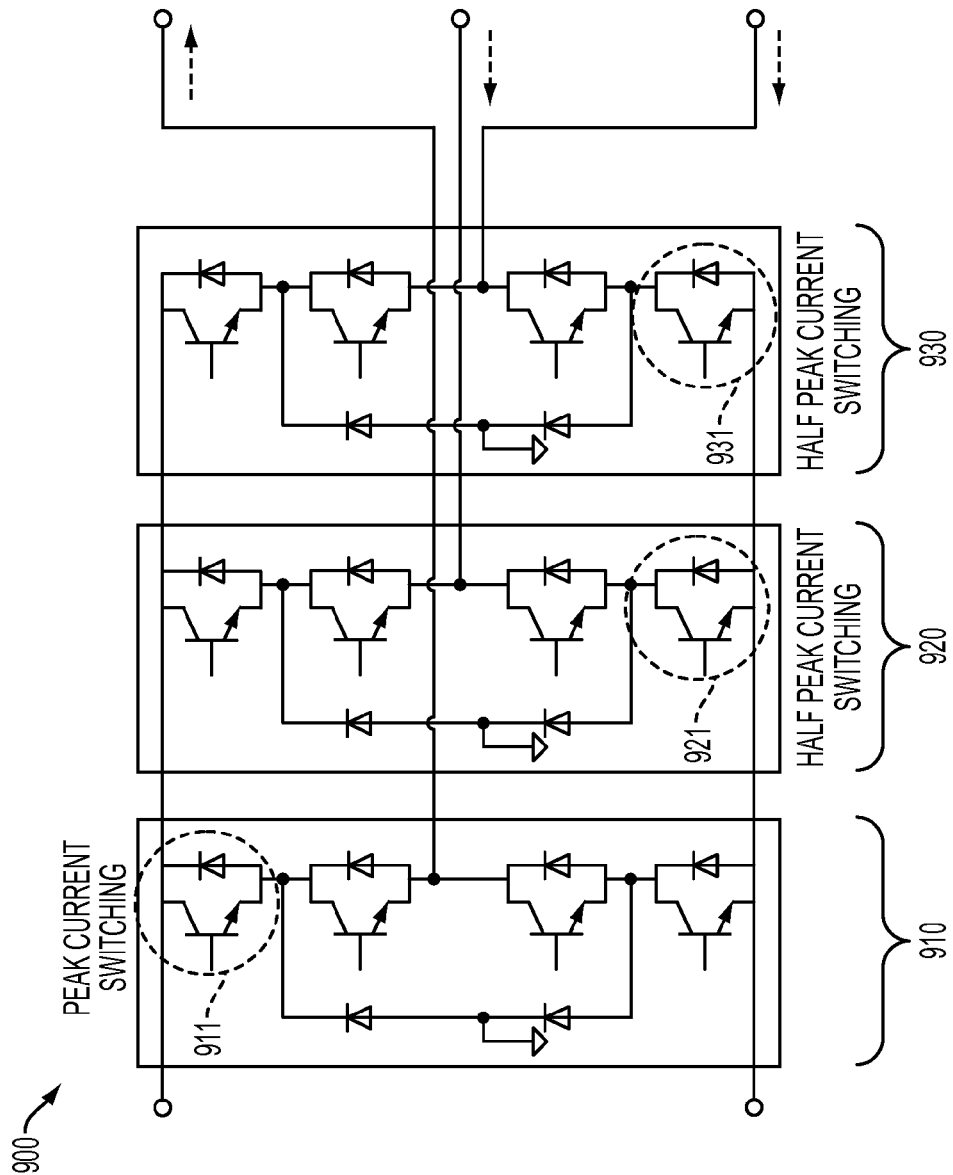
FIG. 9 illustrates a three-level inverter IGBT switch array in which exemplary embodiments for applying a current control method can be implemented.

FIG. 9 illustrates a three-level inverter IGBT switch array 900 in which exemplary embodiments for applying a current control method can be implemented. The array 900 includes three legs 910, 920, 930, each leg 910, 920, 930 including one or more IGBT switches. As described herein, the IGBT switch is implemented with the motor controllers (e.g., the motor controller 210 in FIG. 2) of aircraft. In one embodiment, a current control method is implemented to spread the power semiconductor (e.g. IGBT) thermal stress more evenly during an electrical start of the aircraft engines. The engine start duty stresses the motor controller differently as compared to a continuous motoring load. Significant among the differences is the very high thermal and power stresses to the IGBT switch within the first quarter electrical cycle (i.e., the first time period 110 of FIG. 1). The duration of this peak stress is typically shorter than one second. FIG. 9 illustrates, for example, that during peak current conditions in the motor controller, one switch 911 in the first leg 910 experiences the highest thermal stress. During half peak current conditions, a respective switch 921, 931 in the second and third legs 920, 930, respectively, experience the highest thermal stress. The exemplary methods described herein spread the thermal stresses more evenly during engine start-up. Within the first quarter cycle of the output (e.g., the first time period 110 of FIG. 1) of this electrical, the IGBT switch junction temperature rise, can double or even triple in comparison to normal steady state (higher frequency) operation. Increasing the IGBT switch size and weight, and hence the overall motor controller package size and weight, for the sake of this short duty-cycle (one minute) engine start can be addressed with the methods described herein without changing the motor controller package size and weight.

As described herein, the IGBT switch peak junction temperature is significantly reduced by controlling the motor current magnitude profile. In one embodiment, if the current magnitude starts at 0.5 per unit (pu) and increases to 1.0 pu in 0.6 seconds, the peak IGBT switch junction temperature could be reduced by nearly 30° C. As such, by adjusting the rate of current increase per unit time, temperature reduction in the IGBT is attained.

In addition, the IGBT switch junction temperature reaches the peak at around the first current peak and decays nearly exponentially. Therefore if the current profile is increased following a near exponential curve, a low flat peak temperature of the IGBT switch is achieved while maximizing the available torque for accelerating the generator. Another 12° C. of IGBT switch temperature reduction is achieved by implementing an exponential current profile.

If in addition, a frequency ramp is from a non-zero frequency, further temperature reduction of the IGBT switch can be achieved. Alternatively, motor controller output current could ramp from a higher initial value to boost acceleration torque.

In another embodiment, when necessary for the purpose of rotor pole alignment, a dwell time at the initial non-zero frequency can also be introduced. The non-zero frequency allows time for the rotor to catch up with the stator field. Synchronous and induction torques enable rotor pole alignment. By combining with the current profile, which controls the current increase over a period of time, in addition to adding the dwell time, the rotor can catch up to synchronization.

By using this controlled exponential current ramp profile, and the dwell time as described herein, a motor controller designed for other motoring load applications can be used for engine start without increasing the IGBT switch size.

Figure 10:
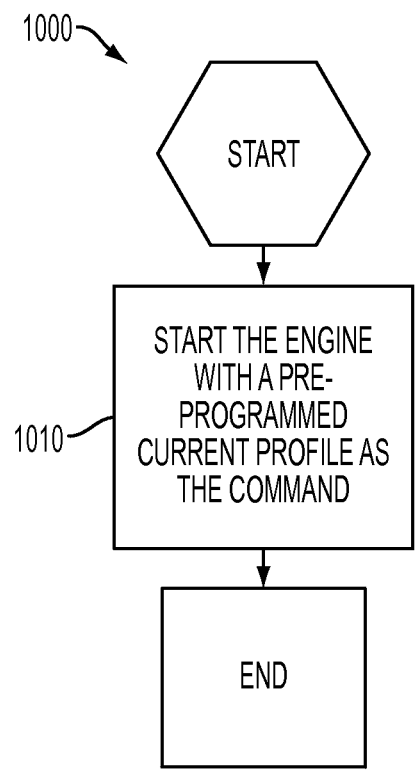
FIG. 10 illustrates a flowchart for a method of applying a current profile to a motor controller in accordance with exemplary embodiments.

FIG. 10 illustrates a flowchart for a method 1000 of applying a current profile to a motor controller in accordance with exemplary embodiments. At block 1010, during engine startup implementing a motor controller, an appropriate current profile as described herein is programmed into the motor controller.

In another embodiment, a frequency ramp method reduces IGBT thermal stress during an electrical start of the main engine can be implemented. When the motor controller (e.g., the motor controller 210 of FIG. 2) is used to ramp up the electric generator machine for the purpose of engine start in a more electric aircraft, the power semiconductor switch (e.g., IGBT) junction is subject to a very high thermal stress (for a short durations under a second). The motor controller IGBT switch would have to be sized based on this brief thermal stress resulting in undesirable weight increase. By using the frequency ramp profile described herein, the IGBT switch thermal stress is reduced significantly so that IGBT switch size increase would not be necessary for engine start duty, hence reducing the aircraft weight.

As described herein, the motor controller designed for a certain continuous motor load can be used to spin the generator up to 400 Hz to start the engine. The engine may or may not be connected to the generator when spinning the generator. The motor controller output is a three phase AC voltage with a frequency ramps up from zero or close to zero frequency to 400 Hz. Because of the slow frequency ramp, one of the IGBT could experience a switching loss of nearly 3.14 times of that during a high frequency steady operation. In addition, the IGBT thermal time constant is typically less than 100 ms. Typically, the first sinusoidal peak stresses the IGBT the most as compared to other peaks. Therefore, if the frequency ramp starts from a non-zero frequency, say 4 Hz (i.e., about 1% of full speed frequency), the IGBT stress would be reduced significantly. In one embodiment, a frequency ramp from a non-zero frequency reduces peak IGBT switch thermal stresses not only if rotor position is known and fed back to the motor controller, but also if the rotor position is unknown and an open-loop generator start algorithm is utilized. By implementing the frequency ramp methods described herein, IGBT switch thermal stresses are reduced significantly so that the IGBT switch size increase would not be necessary for engine start duty, hence reducing the aircraft weight.

Referring again to FIG. 9, the exemplary frequency ramp methods can be implemented in the three-level inverter IGBT switch array 900. In one embodiment, the frequency ramp method is implemented to spread the power semiconductor (e.g. IGBT) thermal stress more evenly during an electrical start of the aircraft engines.

In one embodiment, the IGBT peak junction temperature is relieved by ramping up the motor controller output frequency from a non-zero frequency. By starting from a non-zero frequency, (e.g., 4 Hz), localized heating is reduced at one particular IGBT by shifting the heat between different IGBT's in time. As such, the IGBT's are heated more evenly. In one embodiment, where sensorless starting of an engine through a synchronous motor (generator used as motor) the frequency ramp method can be implemented. At the beginning of the engine start, when the rotor position is unknown, starting from a non-zero frequency generates an induction torque through damper windings. This induction torque is always in forward direction and aids the initial pole alignment and acceleration. Depending on the capability of the damper winding, different initial frequencies could be used, a 1% starting frequency (i.e., about) 4 Hz gives 1% slip, and an 8% starting frequency would give 2% slip, for example. In the example, compared to starting at 0 Hz, starting from 4 Hz would result in a 10° C. IGBT junction temperature reduction, and from 8 Hz would result in a 20° C. temperature reduction.

When necessary for the purpose of rotor pole alignment, a dwell time at the initial non-zero frequency can also be introduced to give time for the rotor to catch up with the stator field, and pull into synchronization by synchronous torque. In addition, by using this non-zero initial frequency ramp, and the dwell, a motor controller designed for other motoring load applications can be used for engine start without increasing the IGBT size.

Figure 11:
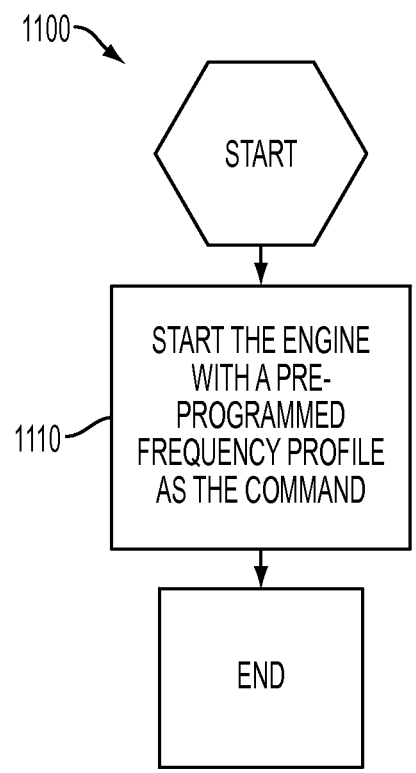
FIG. 11 illustrates a flowchart for a method of applying a frequency ramp to a motor controller in accordance with exemplary embodiments.

FIG. 11 illustrates a flowchart for a method 1100 of applying a frequency ramp to a motor controller in accordance with exemplary embodiments. At block 1110, during engine startup implementing a motor controller, an appropriate frequency ramp as described herein is programmed into the motor controller.

The motor controllers described herein can be any suitable microcontroller or microprocessor for executing the instructions (e.g., on/off commands) described herein. As such, the suitable microcontroller or microprocessor can be any custom made or commercially available processor, a central processing unit (CPU), an auxiliary processor among several processors, a semiconductor based microprocessor (in the form of a microchip or chip set), a macroprocessor, or generally any device for executing software instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the methods are implemented in hardware, the methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include a reduction in switch ratings high power motor controllers resulting in significant weight & size savings, key requirements for aerospace applications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermal stress reduction method for an aircraft motor controller having a three-level inverter switch array, and configured to control an electric power generator coupled to an aircraft engine, the method comprising:
ramping the electric power generator to start an aircraft engine;
during a time period associated with an aircraft engine start sequence:
toggling the three-level inverter switch array to a three-level pulse width modulation (PWM) mode;
determining if a first time interval in the three-level PWM mode exceeds a predetermined three-level PWM mode interval;

toggling the three-level inverter switch array to a two-level PWM mode, in response to the first time interval exceeding the three-level PWM mode interval;

determining if a second time interval in the two-level PWM mode exceeds a predetermined two-level PWM mode interval; and toggling the three-level inverter switch array to the three-level PWM mode, in response to the second time interval exceeding the two-level PWM mode interval, wherein the three-level inverter switch array includes a first switch, a second switch, a third switch and a fourth switch, wherein the first switch, the second switch, the third switch and the fourth switch are configured in a serial arrangement, the three-level PWM mode includes alternating between switching on the first switch and the third switch while applying a PWM signal to the second switch and the fourth switch, and switching on the second switch and the fourth switch while applying a PWM signal to the first switch and the third switch, the two-level PWM mode includes turning on the first switch and the fourth switch while applying a PWM signal to the second switch and the third switch, and a carrier frequency in the two-level PWM mode is greater than a carrier frequency in the three-level PWM mode.

2. The method as claimed in claim 1 wherein during the three-level PWM mode, the first and fourth switches dissipate a greater amount of thermal energy relative to the second and third switches.

3. The method as claimed in claim 2 wherein during the two-level PWM mode, the second and third switches dissipate a greater amount of thermal energy relative to the first and fourth switches.

4. The method as claimed in claim 1 wherein a ratio of three-level PWM mode interval to the two-level PWM mode internal is inversely proportional to a ratio of a three-level PWM mode thermal loss to a two-level PWM mode thermal loss.

5. An engine start system, comprising:
an electric power generator having a three-level inverter switch array;
an aircraft engine coupled to the electric power generator;
an aircraft motor controller coupled to the electric power generator, the aircraft motor controller configured to:
ramp the electric power generator to start the aircraft engine;
during a time period associated with the aircraft engine start sequence:
toggle the three-level inverter switch array to a three-level pulse width modulation (PWM) mode;
determine if a first time interval in the three-level PWM mode exceeded a predetermined three-level PWM mode interval;
toggle the three-level inverter switch array to a two-level PWM mode, in response to the first time interval exceeding the three-level PWM mode interval;
determine if a second time interval in the two-level PWM mode exceeded a predetermined two-level PWM mode interval; and
toggle the three-level inverter switch array to the three-level PWM mode, in response to the second time interval exceeding the two-level PWM mode interval, wherein the three-level inverter switch array includes a first switch, a second switch, a third switch and a fourth switch, wherein the first switch, the second switch, the third switch and the fourth switch are configured in a serial arrangement, the three-level PWM mode includes alternating between switching on the first switch and the third switch while applying a PWM signal to the second switch and the fourth switch, and switching on the second switch and the fourth switch while applying a PWM signal to the first switch and the third switch, the two-level PWM mode includes turning on the first switch and the fourth switch while applying a PWM signal to the second switch and the third switch, and a carrier frequency in the two-level PWM mode is greater than a carrier frequency in the three-level PWM mode.

6. The system as claimed in claim 5 wherein during the three-level PWM mode, the first and fourth switches dissipate a greater amount of thermal energy relative to the second and third switches.

7. The system as claimed in claim 6 wherein during the two-level PWM mode, the second and third switches dissipate a greater amount of thermal energy relative to the first and fourth switches.

8. The system as claimed in claim 5 wherein a ratio of three-level PWM mode interval to the two-level PWM mode internal is inversely proportional to a ratio of a three-level PWM mode thermal loss to a two-level PWM mode thermal loss.

9. The method of claim 1, wherein the predetermined three-level PWM mode interval is less than a semiconductor switch thermal time constant of the three-level inverter switch array.

10. The engine start system of claim 5, wherein the predetermined three-level PWM mode interval is less than a semiconductor switch thermal time constant of the three-level inverter switch array.

* * * * *